United States Patent
Constant et al.

(10) Patent No.: US 6,370,944 B1
(45) Date of Patent: Apr. 16, 2002

(54) FLUID LEAK FINDER FOR A VEHICLE

(76) Inventors: William Constant; Kevin T. Doyle, both of 98 E. Bedell St., Freeport, NY (US) 11520

( * ) Notice: Subject to any disclaimer, the term of this patent is extended or adjusted under 35 U.S.C. 154(b) by 0 days.

(21) Appl. No.: 09/822,402

(22) Filed: Mar. 30, 2001

(51) Int. Cl.$^7$ .................. G01M 15/00; G01M 3/32; G01M 3/26
(52) U.S. Cl. .................. 73/40; 73/47; 73/118.1; 73/49.7
(58) Field of Search .................. 73/40, 47, 37, 73/118.1, 119 R, 49.7

(56) References Cited

U.S. PATENT DOCUMENTS

| | | | |
|---|---|---|---|
| 1,874,694 A | * 8/1932 | Broce | 73/47 |
| 2,625,033 A | * 1/1953 | Adair | 73/47 |
| 2,859,612 A | * 11/1958 | Morse | 73/40 |
| 3,751,978 A | 8/1973 | Crawford | 73/49.7 |
| 3,827,283 A | * 8/1974 | Lerner et al. | 73/40 |
| 3,874,225 A | * 4/1975 | Fegel | 73/40 |
| 3,973,429 A | 8/1976 | Durgan et al. | 73/49.7 |
| 4,157,028 A | 6/1979 | Moffett, III | 73/49.7 |
| D253,811 S | 1/1980 | Bljumshtein et al. | D10/85 |
| 4,364,261 A | * 12/1982 | Ashwith et al. | 73/40 |
| 4,494,402 A | 1/1985 | Carney | 73/40 |
| 4,574,620 A | * 3/1986 | Cohl | 73/47 |
| 4,809,542 A | 3/1989 | Jones | 73/45.8 |
| 5,272,911 A | * 12/1993 | Beggs et al. | 73/49.7 |
| 5,293,771 A | * 3/1994 | Ridenour | 73/40 |
| 5,417,101 A | * 5/1995 | Weich | 73/38 |
| 5,490,413 A | * 2/1996 | Atkinson | 73/40 |
| 5,507,959 A | * 4/1996 | Glick | 210/797 |
| 5,585,549 A | * 12/1996 | Brevick et al. | 73/49.7 |

* cited by examiner

*Primary Examiner*—Hezron Williams
*Assistant Examiner*—David J. Wiggins

(57) ABSTRACT

A fluid leak finder device for a vehicle for finding oil leaks preferably in an engine of a vehicle. The fluid leak finder device for a vehicle includes an air-regulating container having top, bottom, and side walls; and also includes a plurality of conduits being disposed in the air-regulating container and being interconnected; and further includes a plurality of coupler assemblies being disposed through the walls of the air-regulating container and being connected to the conduits; and also includes an air pressure valve assembly being disposed through one of the walls of the air-regulating container and being disposed in an intersection of the conduits; and further includes an air pressure gauge being connected to one of the coupler assemblies for setting air pressure through the conduits; and also includes a hose assembly including a hose member being connected to another one of coupler assemblies and being adapted to supply compressed air to a part of a vehicle such as an engine block.

8 Claims, 5 Drawing Sheets

FLUID LEAK FINDER FOR A VEHICLE

BACKGROUND OF THE INVENTION

1. Field of the Invention

The present invention relates to a fluid leak finder and more particularly pertains to a new fluid leak finder device for a vehicle for finding oil leaks preferably in an engine of a vehicle.

2. Description of the Prior Art

The use of a fluid leak finder is known in the prior art. More specifically, a fluid leak finder heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,751,978; 4,809, 542; 4,494,402; 4,157,028; 3,973,429; and U.S. Pat. No. Des. 253,811.

While these devices fulfill their respective, particular objectives and requirements, the aforementioned patents do not disclose a new fluid leak finder device for a vehicle. The inventive device includes an air-regulating container having top, bottom, and side walls; and also includes a plurality of conduits being disposed in the air-regulating container and being interconnected; and further includes a plurality of coupler assemblies being disposed through the walls of the air-regulating container and being connected to the conduits; and also includes an air pressure valve assembly being disposed through one of the walls of the air-regulating container and being disposed in an intersection of the conduits; and further includes an air pressure gauge being connected to one of the coupler assemblies for setting air pressure through the conduits; and also includes a hose assembly including a hose member being connected to another one of coupler assemblies and being adapted to supply compressed air to a part of a vehicle such as an engine block.

In these respects, the fluid leak finder device for a vehicle according to the present invention substantially departs from the conventional concepts and designs of the prior art, and in so doing provides an apparatus primarily developed for the purpose of finding oil leaks preferably in an engine of a vehicle.

SUMMARY OF THE INVENTION

In view of the foregoing disadvantages inherent in the known types of fluid leak finder now present in the prior art, the present invention provides a new fluid leak finder device for a vehicle construction wherein the same can be utilized for finding oil leaks preferably in an engine of a vehicle.

The general purpose of the present invention, which will be described subsequently in greater detail, is to provide a new fluid leak finder device for a vehicle which has many of the advantages of the fluid leak finder mentioned heretofore and many novel features that result in a new fluid leak finder device for a vehicle which is not anticipated, rendered obvious, suggested, or even implied by any of the prior art fluid leak finder, either alone or in any combination thereof.

To attain this, the present invention generally comprises an air-regulating container having top, bottom, and side walls; and also includes a plurality of conduits being disposed in the air-regulating container and being interconnected; and further includes a plurality of coupler assemblies being disposed through the walls of the air-regulating container and being connected to the conduits; and also includes an air pressure valve assembly being disposed through one of the walls of the air-regulating container and being disposed in an intersection of the conduits; and further includes an air pressure gauge being connected to one of the coupler assemblies for setting air pressure through the conduits; and also includes a hose assembly including a hose member being connected to another one of coupler assemblies and being adapted to supply compressed air to a part of a vehicle such as an engine block.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fluid leak finder device for a vehicle which has many of the advantages of the fluid leak finder mentioned heretofore and many novel features that result in a new fluid leak finder device for a vehicle which is not anticipated, rendered obvious, suggested, or even implied by any of the prior art fluid leak finder, either alone or in any combination thereof.

It is another object of the present invention to provide a new fluid leak finder device for a vehicle which may be easily and efficiently manufactured and marketed.

It is a further object of the present invention to provide a new fluid leak finder device for a vehicle which is of a durable and reliable construction.

An even further object of the present invention is to provide a new fluid leak finder device for a vehicle which is susceptible of a low cost of manufacture with regard to both materials and labor, and which accordingly is then susceptible of low prices of sale to the consuming public, thereby making such fluid leak finder device for a vehicle economically available to the buying public.

Still yet another object of the present invention is to provide a new fluid leak finder device for a vehicle which provides in the apparatuses and methods of the prior art some of the advantages thereof, while simultaneously overcoming some of the disadvantages normally associated therewith.

Still another object of the present invention is to provide a new fluid leak finder device for a vehicle for finding oil leaks preferably in an engine of a vehicle.

Yet another object of the present invention is to provide a new fluid leak finder device for a vehicle which includes an air-regulating container having top, bottom, and side walls; and also includes a plurality of conduits being disposed in the air-regulating container and being interconnected; and further includes a plurality of coupler assemblies being disposed through the walls of the air-regulating container and being connected to the conduits; and also includes an air pressure valve assembly being disposed through one of the walls of the air-regulating container and being disposed in an intersection of the conduits; and further includes an air pressure gauge being connected to one of the coupler assemblies for setting air pressure through the conduits; and also includes a hose assembly including a hose member being connected to another one of coupler assemblies and being adapted to supply compressed air to a part of a vehicle such as an engine block.

Still yet another object of the present invention is to provide a new fluid leak finder device for a vehicle that is easy and convenient to use.

Even still another object of the present invention is to provide a new fluid leak finder device for a vehicle that saves the user time and effort in trying to locate a leak in a major component of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
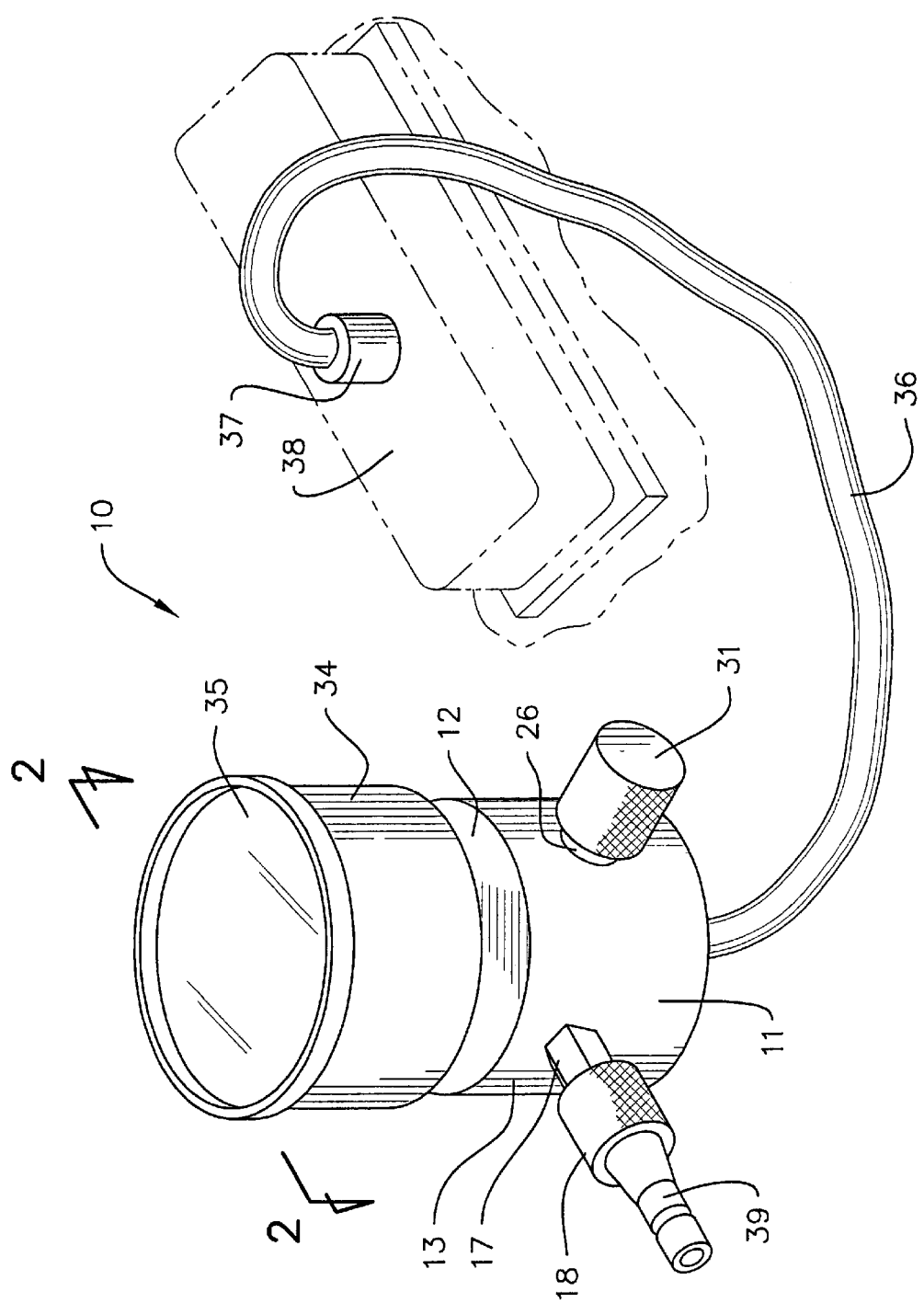
FIG. 1 is a perspective view of a new fluid leak finder device for a vehicle according to the present invention.
Figure 2:
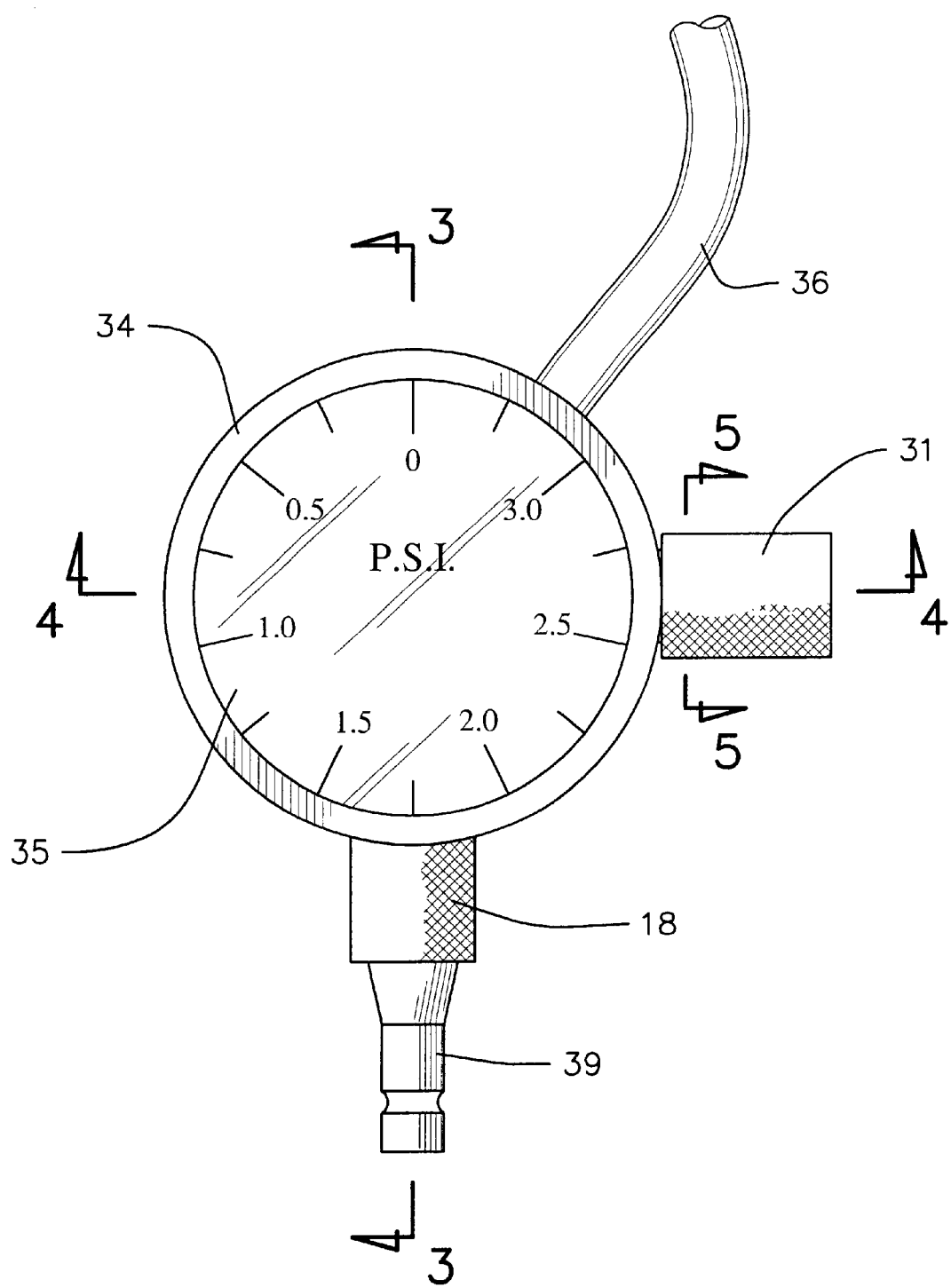
FIG. 2 is a top plan view of the air-regulating container of the present invention.
Figure 3:
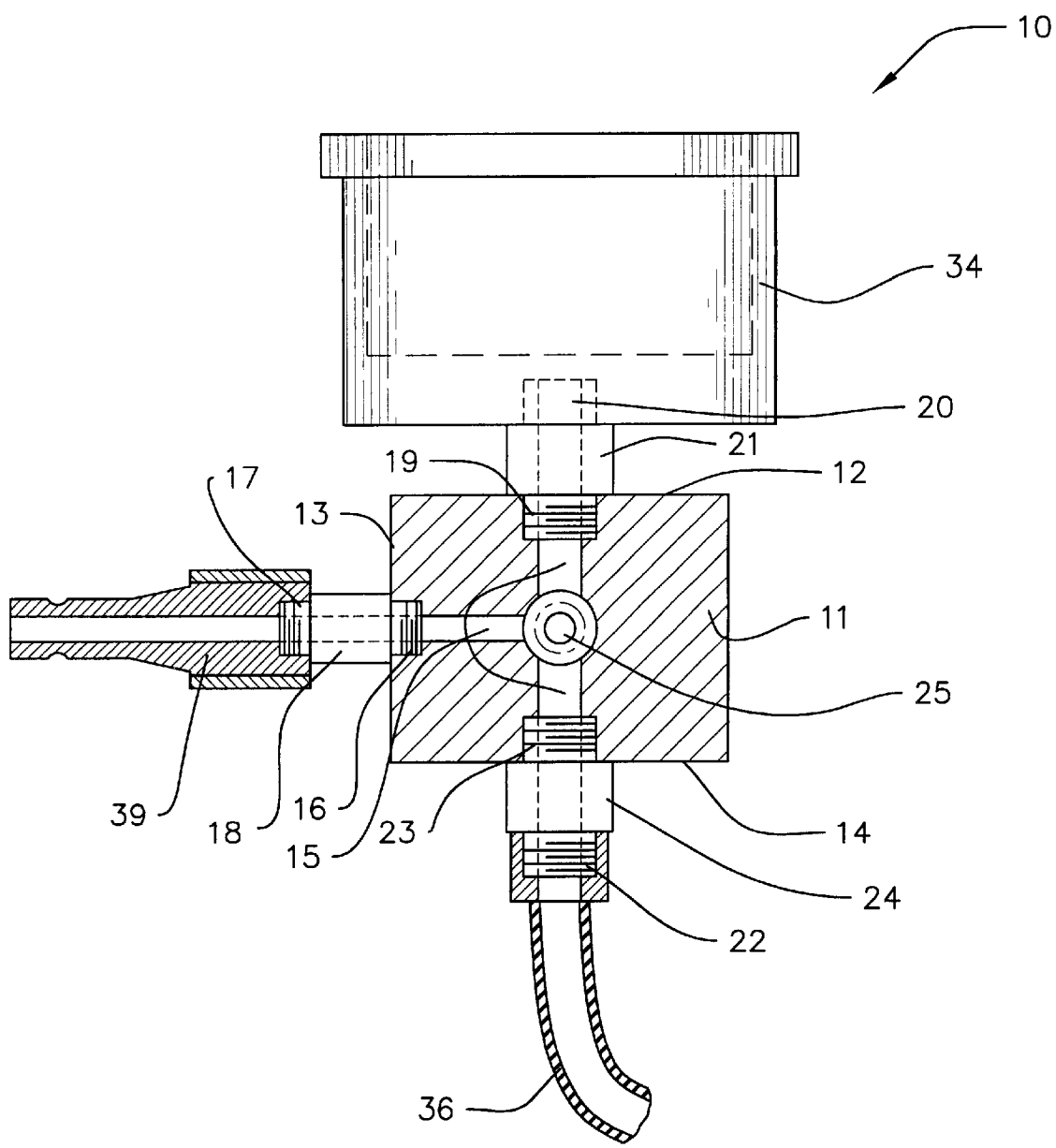
FIG. 3 is a front elevational view of the present invention.
Figure 4:
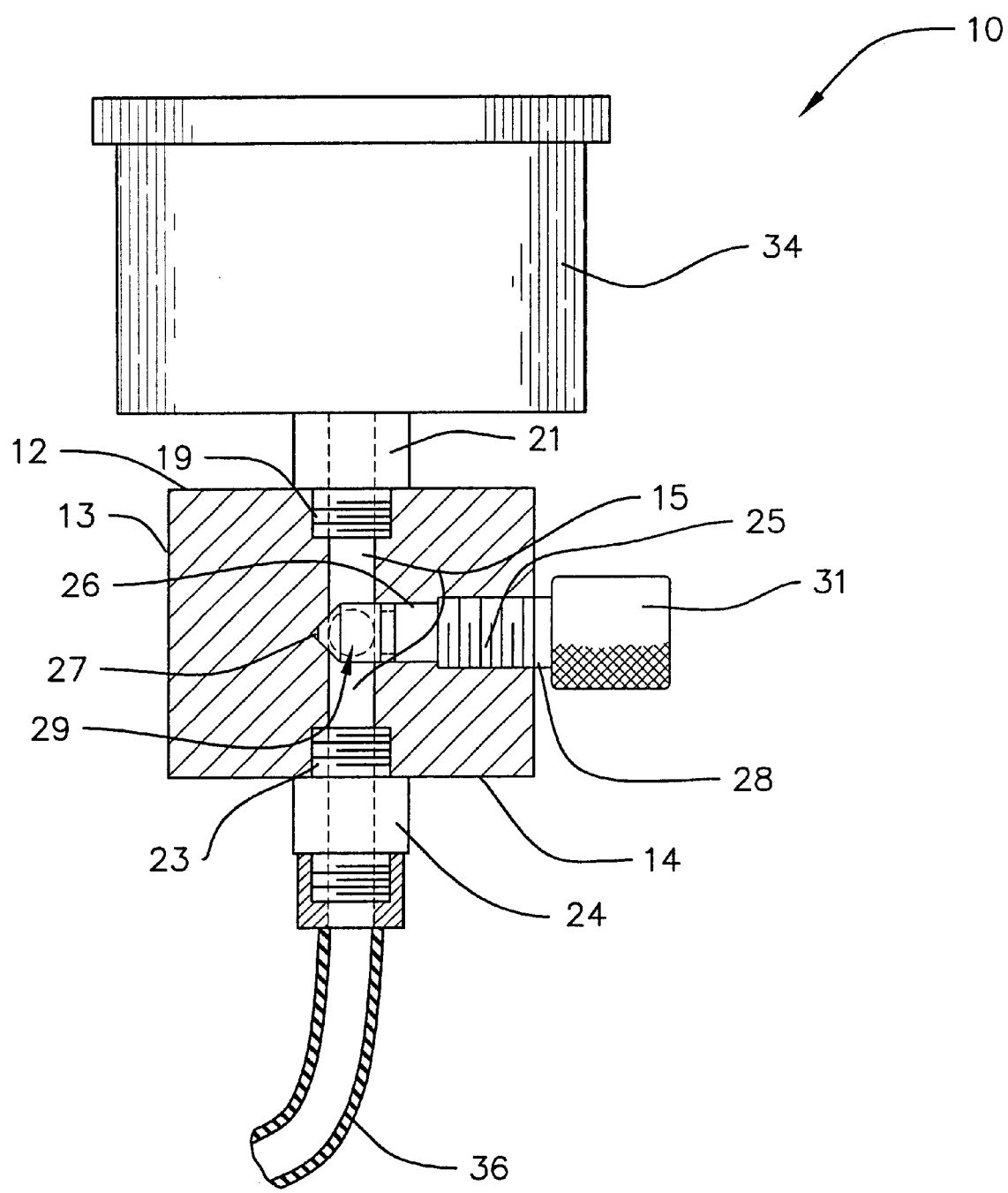
FIG. 4 is a side elevational view of the present invention.
Figure 5:
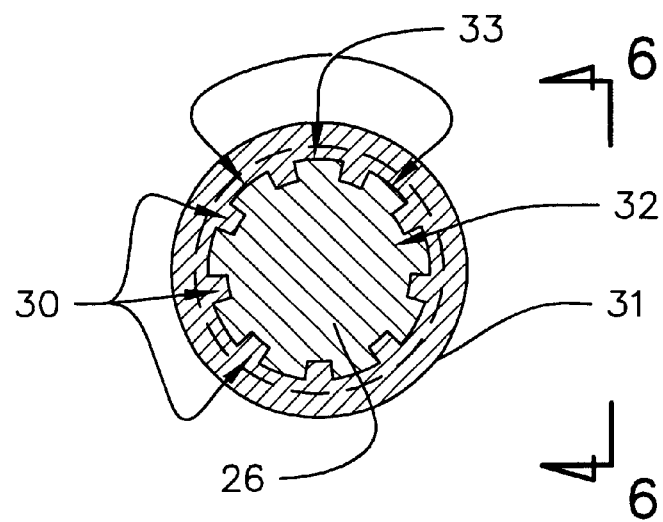
FIG. 5 is a cross-sectional view of the air pressure control knob of the present invention.
Figure 6:
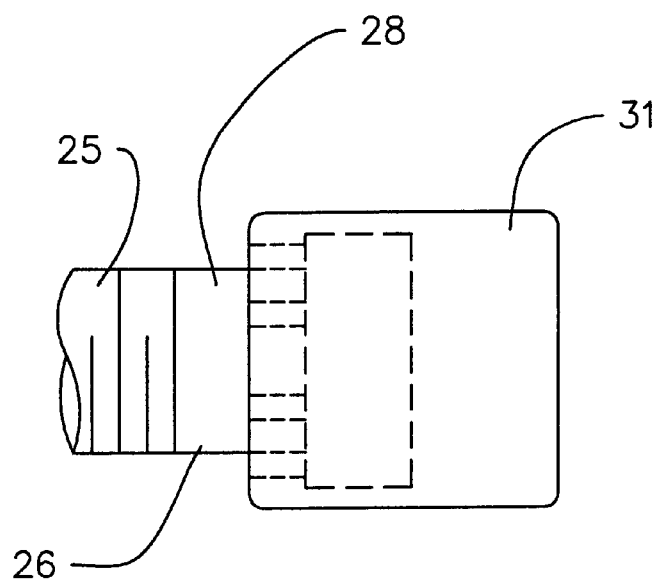
FIG. 6 is a side elevational view of the air pressure control knob of the present invention.

With reference now to the drawings, and in particular to FIGS. 1 through 6 thereof, a new fluid leak finder device for a vehicle embodying the principles and concepts of the present invention and generally designated by the reference numeral 10 will be described.

As best illustrated in FIGS. 1 through 6, the fluid leak finder device for a vehicle 10 generally comprises an air-regulating container 11 having top, bottom, and side walls 12–14. A plurality of conduits 15 is conventionally disposed in the air-regulating container 11 and are interconnected. A plurality of coupler assemblies 16,19,22 are disposed through the walls 12–14 of the air-regulating container 11 and are conventionally connected to the conduits 15. The plurality of coupler assemblies 16,19,22 include a first coupler assembly 16 having a first tubular member 17 extending outwardly of the air-regulating container 11 and also having a first sleeve-like connector 18 being movably disposed about the first tubular member 17, and also includes a second coupler assembly 19 having a second tubular member 20 extending outwardly of the air-regulating container 11 and also having a second sleeve-like connector 21 being movably disposed about the second tubular member 20, and further includes a third coupler assembly 22 having a third tubular member 23 extending outwardly of the air-regulating container 11 and also having a third sleeve-like connector 24 being movably disposed about the third tubular member 23. The first coupler assembly 16 is adapted to be conventionally connected to a hose 39 of an air compressor.

An air pressure valve assembly 25 is conventionally disposed through one of the walls 12–14 of the air-regulating container 11 and is disposed in an intersection of the conduits 15. The air pressure valve assembly 25 includes a shaft 26 having a first end 27 which is movably disposed in the intersection of the conduits 15 and also having a second end 28 which is disposed outside of the air-regulating container 11, and also includes an air pressure control knob 31 being movably disposed about the second end 29 of the shaft 26. The shaft 26 also has a plurality of first keyways 30 being conventionally disposed about a second end portion thereof. The air pressure control knob 31 has a bore 32 disposed therethrough and also has a plurality of second keyways 33 being disposed in a wall forming the bore 32. The first and second keyways 30,33 are interlocked with the shaft 26 having a bore 29 extending laterally therethrough near the first end 27 thereof.

An air pressure gauge 34 is conventionally connected to one of the coupler assemblies 16,19,22 for setting air pressure through the conduits 15. The air pressure gauge 34 is securely connected to the second coupler assembly 19 and has a dial face 35. A hose assembly includes a hose member 35 is conventionally connected to another one of coupler assemblies 16,19,22 and is adapted to supply compressed air to a component 38 of a vehicle such as an engine block. The hose assembly also includes an attachment adapter 37 being conventionally connected at an end of the hose member 36 and being adapted to be connected to the component 38 on the vehicle.

In use, the user turns on the air compressor which sends compressed air through the conduits 15 in the air-regulating container 11, and the user adjusts the air pressure by turning the air pressure control knob 3 1 either in or out relative to the air-regulating container 11. The compressed air is sent through the hose member 36 which is attached to the component 38. If there are any leaks, the fluid will be forced through those leaks in the component 38 upon which the user will be able to clearly detect.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fluid leak finder device for a vehicle comprising:
   an air-regulating container having top, bottom, and side walls;
   a plurality of conduits being disposed in said air-regulating container and being interconnected;
   a plurality of coupler assemblies being disposed through said walls of said air-regulating container and being connected to said conduits;
   an air pressure valve assembly being disposed through one of said walls of said air-regulating container and being disposed in an intersection of said conduits;
   an air pressure gauge being connected to one of said coupler assemblies for setting air pressure through said conduits; and
   a hose assembly including a hose member being connected to another one of coupler assemblies and being adapted to supply compressed air to a component of a vehicle such as an engine block.

2. A fluid leak finder device for a vehicle as described in claim 1, wherein said plurality of coupler assemblies include a first coupler assembly having a first tubular member extending outwardly of said air-regulating container and also having a first sleeve-like connector being movably disposed about said first tubular member, and also include a second coupler assembly having a second tubular member extending outwardly of said air-regulating container and also having a second sleeve-like connector being movably disposed about said second tubular member, and further include a third coupler assembly having a third tubular member extending outwardly of said air-regulating container and also having a third sleeve-like connector being movably disposed about said third tubular member, said first coupler assembly being adapted to be connected to a hose of an air compressor.

3. A fluid leak finder device for a vehicle as described in claim 1, wherein said air pressure valve assembly includes a shaft having a first end which is movably disposed in the intersection of said conduits and also having a second end which is disposed outside of said air-regulating container, and also includes an air pressure control knob being movably disposed about said second end of said shaft.

4. A fluid leak finder device for a vehicle as described in claim 3, wherein said shaft has a plurality of first keyways being disposed about a second end portion thereof, said air pressure control knob having a bore therethrough and also having a plurality of second keyways being disposed in a wall forming said bore, said first and second keyways being interlocked.

5. A fluid leak finder device for a vehicle as described in claim 4, wherein said shaft also has a bore extending laterally therethrough near said first end thereof.

6. A fluid leak finder device for a vehicle as described in claim 3, wherein said air pressure gauge is securely connected to said second coupler assembly and has a dial face.

7. A fluid leak finder device for a vehicle as described in claim 3, wherein said hose assembly also includes an attachment adapter being connected at an end of said hose member and being adapted to be connected to the component on the vehicle.

8. A fluid leak finder device for a vehicle comprising:
   an air-regulating container having top, bottom, and side walls;
   a plurality of conduits being disposed in said air-regulating container and being interconnected;
   a plurality of coupler assemblies being disposed through said walls of said air-regulating container and being connected to said conduits, said plurality of coupler assemblies including a first coupler assembly having a first tubular member extending outwardly of said air-regulating container and also having a first sleeve-like connector being movably disposed about said first tubular member, and also including a second coupler assembly having a second tubular member extending outwardly of said air-regulating container and also having a second sleeve-like connector being movably disposed about said second tubular member, and further including a third coupler assembly having a third tubular member extending outwardly of said air-regulating container and also having a third sleeve-like connector being movably disposed about said third tubular member, said first coupler assembly being adapted to be connected to a hose of an air compressor;
   an air pressure valve assembly being disposed through one of said walls of said air-regulating container and being disposed in an intersection of said conduits, said air pressure valve assembly including a shaft having a first end which is movably disposed in the intersection of said conduits and also having a second end which is disposed outside of said air-regulating container, and also including an air pressure control knob being movably disposed about said second end of said shaft, said shaft also having a plurality of first keyways being disposed about a second end portion thereof, said air pressure control knob having a bore therethrough and also having a plurality of second keyways being disposed in a wall forming said bore, said first and second keyways being interlocked, said shaft having a bore extending laterally therethrough near said first end thereof;
   an air pressure gauge being connected to one of said coupler assemblies for setting air pressure through said conduits, said air pressure gauge being securely connected to said second coupler assembly and having a dial face; and
   a hose assembly including a hose member being connected to another one of coupler assemblies and being adapted to supply compressed air to a component of a vehicle such as an engine block, said hose assembly also including an attachment adapter being connected at an end of said hose member and being adapted to be connected to the component on the vehicle.

* * * * *